Feb. 14, 1939. J. E. BLOOMBERG 2,147,361
SEAT
Filed Feb. 8, 1936
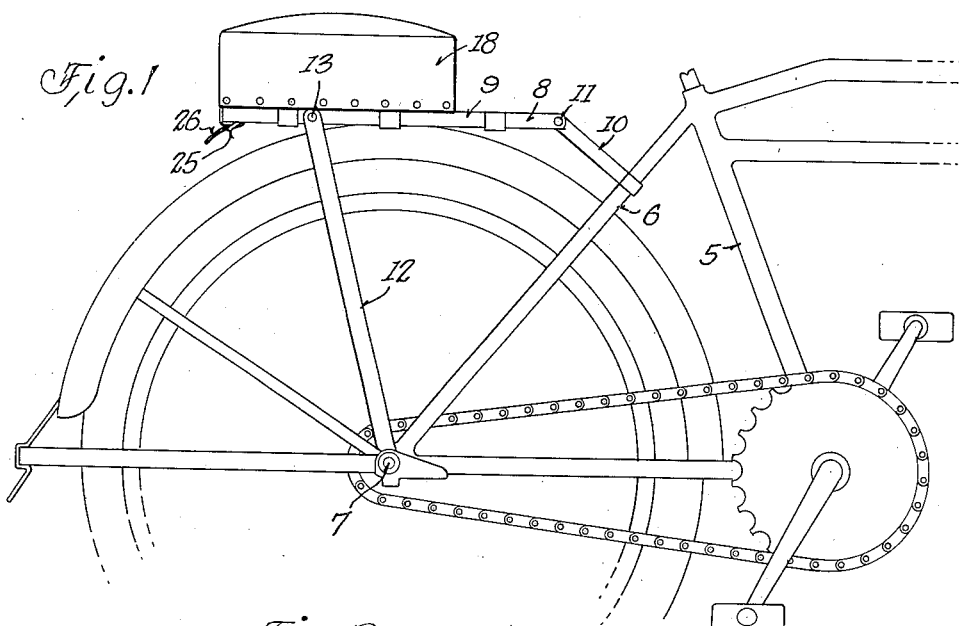
Fig. 1
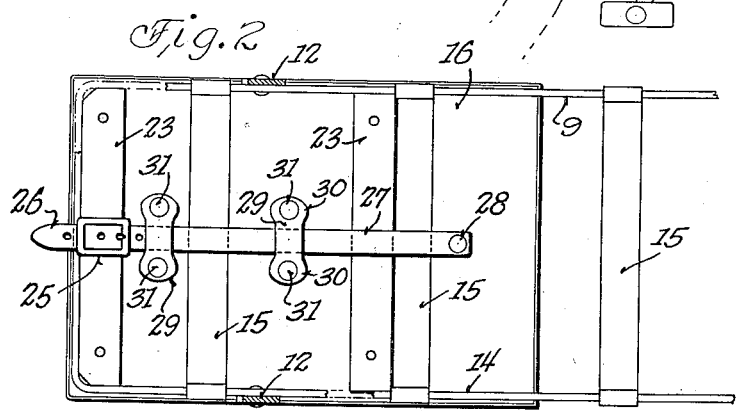
Fig. 2
Fig. 3
INVENTOR.
Joseph E. Bloomberg
BY Louis O. French
ATTORNEY.

Patented Feb. 14, 1939

2,147,361

UNITED STATES PATENT OFFICE 2,147,361

SEAT

Joseph E. Bloomberg, Milwaukee, Wis., assignor to Milwaukee Saddlery Company, Milwaukee, Wis., a corporation of Wisconsin Application February 8, 1936, Serial No. 62,890

2 Claims. (Cl. 155—5.11)

The invention relates to seats.

The general object of the invention is to provide an auxiliary seat for bicycles that may be readily mounted and secured to the luggage carrier supported on the rear axle and rear fork of the bicycle so that an extra passenger may be carried.

A further object of the invention is to provide a luggage carrier seat for bicycles of simple but very comfortable construction in which a covered sponge rubber cushion is mounted on a base secured to the luggage carrier and held thereto against lateral and endwise movement.

The invention further consists in the several features hereinafter set forth and more particularly defined by claims at the conclusion hereof.

In the drawing:

Fig. 1 is a side elevation view of a luggage carrier seat for bicycles embodying the invention;

Fig. 2 is a bottom plan view of the seat and its support;

Fig. 3 is an enlarged side elevation view of the seat embodying the invention, parts being broken away and parts being shown in section.

In the drawing, the numeral 5 designates generally a bicycle having a rear fork 6 and a rear axle 7 and a luggage carrier 8 mounted on the bicycle.

The luggage carrier 8 has a supporting platform or frame portion 9 which is secured to the fork 6 by a bar 10 pivoted at 11 to the portion 9 and clamped to said fork and which is supported from the rear axle 7 by metal legs or bars 12 pivoted at their upper ends 13 to said portion 9 and having eyed lower ends fitting over the ends of the rear axle. These luggage carriers may take different structural forms, but the frame portion 9 usually includes the marginal metal frame member 14 and transverse metal brace bars 15 secured at their ends to said marginal frame member and arranged in spaced relation along the same.

The seat embodying the invention is adapted to be mounted on the frame portion 9 of the luggage carrier and to be secured thereto against lateral and longitudinal movement. This seat comprises a base member 16 here shown as a piece of wood upon which a deep cushion 17 of sponge rubber is mounted, said cushion being covered by a covering 18 of flexible material which extends down below the cushion and is secured at its lower edges 19 by tacks 20 or other suitable fastening means anchored in the edge portions of the base member 16.

The cushion 17 may be formed of a plurality of superimposed layers of pieces of sponge rubber which are secured together by a suitable cold vulcanizing process to form a block of the desired height or depth and size or shape, this block being then cemented to a wood or metal base 16.

The covering 18 is not secured to the cushion block but may move therewith and relative thereto and has large air holes 22 punched or formed in it at its opposite ends so that air may be readily drawn into and exhausted from the cushion as it moves up and down with the rider, and this has been found to be of considerable advantage, as the action of the air keeps the cushion cool. The covering 18 may be of leather, imitation leather, or any suitable flexible fabric preferably having a waterproof finish.

For holding the seat to the luggage carrier frame the base member 16 has wood cleats or bars 23 nailed or otherwise suitably secured thereto, the length of these bars being equal to the width between the sides of the marginal frame 14 between which they fit and thus prevent lateral shifting of the seat relative to the carrier. These bars 23 are also arranged in spaced relation and, with the particular carrier shown, one bar is arranged to abut at one side against the end part of the frame 14, and the other bar is arranged to abut at one side against another of the brace bars 15 so that longitudinal movement of the seat relative to the carrier is thereby prevented. For securing the seat and carrier in assembled relation a two part leather strap is secured to the seat and is adapted to be strapped about portions of the carrier frame. As shown one section 24 of the strap is secured at the back end of the seat and extends around the back end of the frame member 14 and has the buckle 25 secured thereto to engage the tongue 26 of the other strap section 27 which is anchored at 28 to the base, portions of this section being adapted to pass through leather clips or eyelets 29 which are formed by transversely disposed leather strips secured at their ends 30 to the base 16 by nails 31. These clips are mounted on opposite sides of one of the brace bars 15, with one clip disposed adjacent the back end cleat 23 and the other adjacent the front cleat 23 so that the strap, when threaded through the clips, clamps the base down onto the brace bars 15, the strap passing from its point of anchorage at 28 beneath and against the forward cleat 23 and the brace 15 adjacent thereto, thence through the front eyelet beneath and against the rear brace 15 and then through the rear eyelet 29 and secured to the buckle 25 which is on that section of the strap clamping the base against the back end of the frame.

The seat is of simple but very comfortable and durable construction and may be quickly applied by any boy or girl to the rear luggage carrier of his or her bicycle.

It is to be understood that this invention is not to be limited to any particular form or arrangement of parts except in so far as such limitations are included in the appended claims.

What I claim as my invention is:

1. The combination of a bicycle luggage carrier having a latticed frame, of a cushioned seat having a base member provided with parts interlocking with said carrier to prevent lateral and lengthwise movement of said seat relative to said carrier, and a strap secured to opposite end portions and the intermediate portion of said base member to maintain said base member and carrier in interlocked relation.

2. The combination with a bicycle luggage carrier having a marginal frame and spaced transverse braces, of a cushioned seat having a base member provided with cleats to engage said frame and one of said braces to prevent lateral and lengthwise movement of said seat relative to said carrier, and a strap secured to opposite end portions and the intermediate portion of said base member to maintain said base member and carrier in interlocked relation.

JOSEPH E. BLOOMBERG.